(12) United States Patent
Ten Bok (10) Patent No.: US 9,038,546 B2
(45) Date of Patent: May 26, 2015

(54) PLASTIC PALLET

(75) Inventor: Michaël Henricus Maria Ten Bok, Elst (NL)

(73) Assignee: MEPPP B.V., Elst (NL)

( * ) Notice: Subject to any disclaimer, the term of this patent is extended or adjusted under 35 U.S.C. 154(b) by 0 days.

(21) Appl. No.: 13/809,788

(22) PCT Filed: Jul. 13, 2011

(86) PCT No.: PCT/NL2011/050506
§ 371 (c)(1),
(2), (4) Date: Mar. 15, 2013

(87) PCT Pub. No.: WO2012/008832
PCT Pub. Date: Jan. 19, 2012

(65) Prior Publication Data
US 2013/0160680 A1 Jun. 27, 2013

(30) Foreign Application Priority Data
Jul. 13, 2010 (NL) .................................. 1038100

(51) Int. Cl.
*B65D 19/38* (2006.01)
*B65D 19/00* (2006.01)
(Continued)

(52) U.S. Cl.
CPC ........ *B65D 19/0048* (2013.01); *B65D 19/0004* (2013.01); *B65D 19/38* (2013.01); *B29C 69/02* (2013.01); *B65D 19/0095* (2013.01); *B29C 44/0407* (2013.01); *B29C 44/586* (2013.01); *B65D 19/0026* (2013.01); *B65D 2203/10* (2013.01); *B65D 2519/00034* (2013.01); *B65D 2519/00069* (2013.01); *B65D 2519/00104* (2013.01); *B65D 2519/00273* (2013.01); *B65D 2519/00288* (2013.01);
(Continued)

(58) Field of Classification Search
CPC .......... B65D 2519/00323; B65D 2519/00333; B65D 2519/00373; B65D 2519/00218; B65D 2519/00273
USPC .............. 108/56.1, 56.3, 57.17, 57.21, 57.25, 108/57.27, 901, 902
See application file for complete search history.

(56) References Cited

U.S. PATENT DOCUMENTS 3,702,100 A * 11/1972 Wharton ...................... 108/53.3
3,719,157 A * 3/1973 Arcocha et al. ............ 108/57.25
(Continued)

FOREIGN PATENT DOCUMENTS

DE 9410091 U1 8/1994
EP 1845023 A1 10/2007
(Continued)

OTHER PUBLICATIONS

International Search Report mailed Feb. 9, 2012 (PCT/NL2011/050506); ISA/EP.

*Primary Examiner* — Hanh V Tran
(74) *Attorney, Agent, or Firm* — Banner & Witcoff, Ltd.

(57) ABSTRACT

A plastic pallet described herein may have a plastic upper deck with an upper side on which goods can be stacked. Furthermore, a plurality of plastic skids are present, spaced apart from the upper deck and arranged substantially parallel to the upper deck. Plastic spacer blocks are located between the upper deck and the skids. The upper deck and the skids are manufactured as separate parts which in an assembled state are tightened together by tightening pins. The tightening pins each extend through a bore in each of the spacer blocks and corresponding holes in the upper deck and the skids.

20 Claims, 9 Drawing Sheets

(51) Int. Cl.
  *B29C 69/02* (2006.01)
  *B29C 44/04* (2006.01)
  *B29C 44/58* (2006.01)

(52) U.S. Cl.
  CPC ........... *B65D 2519/00293* (2013.01); *B65D 2519/00298* (2013.01); *B65D 2519/00323* (2013.01); *B65D 2519/00333* (2013.01); *B65D 2519/00373* (2013.01); *B65D 2519/00572* (2013.01); *B65D 2519/0084* (2013.01); *B65D 2519/0099* (2013.01); *Y10S 108/902* (2013.01)

(56) References Cited

U.S. PATENT DOCUMENTS

| | | | | |
|---|---|---|---|---|
| 4,715,294 A * | 12/1987 | Depew | | 108/57.17 |
| 4,865,202 A * | 9/1989 | Day | | 206/597 |
| 5,057,350 A * | 10/1991 | Gezels | | 428/138 |
| 5,197,396 A * | 3/1993 | Breezer et al. | | 108/56.3 |
| 5,351,628 A * | 10/1994 | Breezer et al. | | 108/56.1 |
| 5,551,353 A * | 9/1996 | Fiedler | | 108/51.3 |
| 5,662,048 A * | 9/1997 | Kralj et al. | | 108/56.3 |
| 5,937,767 A * | 8/1999 | Togawa et al. | | 108/57.26 |
| 6,021,721 A * | 2/2000 | Rushton | | 108/56.3 |
| 6,237,509 B1 * | 5/2001 | Ishido et al. | | 108/57.25 |
| 6,352,039 B1 * | 3/2002 | Woods et al. | | 108/57.25 |
| 6,622,642 B2 * | 9/2003 | Ohanesian | | 108/57.25 |
| 6,705,237 B2 * | 3/2004 | Moore et al. | | 108/57.25 |
| 6,972,144 B2 * | 12/2005 | Roth et al. | | 428/68 |
| 7,712,421 B2 * | 5/2010 | Hartel et al. | | 108/56.3 |
| 8,261,673 B2 * | 9/2012 | Ingham | | 108/51.11 |
| 2005/0076816 A1 * | 4/2005 | Nakano | | 108/51.11 |
| 2005/0103237 A1 * | 5/2005 | Moore et al. | | 108/57.25 |
| 2005/0193929 A1 * | 9/2005 | Ingham | | 108/56.3 |
| 2005/0237184 A1 * | 10/2005 | Muirhead | | 340/539.13 |
| 2006/0201402 A1 * | 9/2006 | Moore et al. | | 108/57.25 |
| 2006/0230988 A1 * | 10/2006 | Berg et al. | | 108/57.25 |
| 2006/0236903 A1 * | 10/2006 | Moore, Jr. | | 108/57.25 |
| 2006/0254477 A1 * | 11/2006 | Moore et al. | | 108/57.25 |
| 2007/0017423 A1 * | 1/2007 | Ingham | | 108/57.17 |
| 2007/0095015 A1 * | 5/2007 | Miyachi et al. | | 52/782.1 |
| 2007/0234933 A1 * | 10/2007 | Donnell et al. | | 108/56.3 |
| 2008/0098935 A1 * | 5/2008 | Roth et al. | | 108/57.17 |
| 2008/0105168 A1 * | 5/2008 | Lee | | 108/56.1 |
| 2008/0110377 A1 * | 5/2008 | Stevens | | 108/51.11 |
| 2008/0156234 A1 * | 7/2008 | van de Camp | | 108/51.11 |
| 2008/0236454 A1 * | 10/2008 | Naidu et al. | | 108/56.1 |
| 2008/0236455 A1 * | 10/2008 | Naidu | | 108/56.1 |
| 2009/0084783 A1 * | 4/2009 | Apps | | 220/6 |
| 2009/0211498 A1 * | 8/2009 | Shea | | 108/57.29 |

FOREIGN PATENT DOCUMENTS

| | | |
|---|---|---|
| WO | 00/41940 A1 | 7/2000 |
| WO | 00/68100 A1 | 11/2000 |
| WO | 2006/080857 A1 | 8/2006 |

* cited by examiner

PLASTIC PALLET

The present application is a U.S. National Phase filing of International Application No. PCT/NL2011/050506, filed on Jul. 13, 2011, designating the United States of America. The present application claims priority to and the benefit of the above-identified application, and the above-identified application is incorporated by reference herein in its entirety.

The present invention relates to a plastic pallet and the manufacturing thereof.

Pallets for storage and transport of all kinds of goods and products are well known. Such a pallet comprises in general an upper deck on which goods or products can be stacked and skids which are arranged spaced apart from the upper deck which define a support surface on which the pallet rests. Between the upper deck and skids are provided spacers which are arranged such that forklift tines can be inserted between the skids and the upper deck to allow lifting of the pallet.

There are also pallets known that have, instead of skids, another deck which can be used to store goods on as well. These pallets can be used to place goods on both sides.

The most widely used pallet type is made of wood. Wood has several disadvantages and is not suitable for applications where for instance hygiene aspects are important for example in the food industry.

Plastic pallets are known in the art. Amongst others they have the advantage that they are better to clean and disinfect compared to wooden pallets. They can be made in one piece or in different parts to be assembled. In general these pallets or their parts are made by means of injection moulding. In lots of plastic pallets presently found on the market, the spacer elements are partly hollow with internal ribs or an internal honeycomb structure. This to provide the necessary load strength on the one hand and to save weight on the other hand.

In EP 1 845 023 is disclosed a plastic pallet which is manufactured in one piece by injection moulding. The upper deck is made of foamed plastic material which is surrounded by a plastic skin layer, preferably made of the same plastic. The spacer blocks between the upper deck and the lower deck of the pallet are formed with a closed outer wall and an internal honeycomb structure.

Plastic pallets with partly hollow structures, in particular partly hollow spacer blocks are easily damaged when they are used with lifting equipment like forklifts. When a hole is bumped into the outer wall of the spacer blocks, this deteriorates the structural integrity of the pallet. Moreover, a damaged outer wall creates a hygiene risk as filth can accumulate in the spacer block. A damaged one-piece plastic pallet will in general become unusable and will be thrown away.

The present invention has for an object to provide an improved plastic pallet.

This object is achieved by a plastic pallet comprising a plastic upper deck with an upper side on which goods can be stacked, a plurality of plastic skids or a lower deck spaced apart from the upper deck and arranged substantially parallel to the upper deck, and solid plastic spacer blocks that are located between the upper deck and the skids or lower deck, wherein the upper deck and the skids/lower deck are manufactured as separate parts which in an assembled state are tightened together by tightening pins, which each extend through a bore in each of the spacer blocks and corresponding holes in the upper deck and the skids/lower deck.

In prior art plastic pallets that are made in one piece the majority of the pallet breakages take place at the junction between the spacer blocks and the upper deck. To reduce the risk of breakage at the junction, often the one-piece plastic pallets have additional material formed there with transition curvatures with a relatively large radius of curvature. In the pallet according to the invention there is a parting line between the spacer blocks and the upper deck, whereby there is no risk of breakage at this location. Furthermore the skin layers of the upper deck and the spacer blocks—which preferably are the most compact layers—are placed against each other, whereby in principle a thicker layer with compact material can be achieved than with one-piece pallets at said junction. Thereby a greater amount of compact material is at the junction which gives the pallet of the invention more strength at said junction. When a pallet according to the invention is handled roughly, the tightening pin may break, which is the weakest part. However, such a tightening pin is easily replaced and is relatively cheap. The more expensive parts such as the injection moulded upper deck and skids can last the whole lifetime of the pallet. Hence, the pallet according to the invention has a considerable economical value after breaking.

In a particularly preferred embodiment of the pallet, the pallet comprises three substantially parallel plastic skids and the upper deck comprises a plurality, in particular five, of substantially parallel longitudinal slats on the upper side and a plurality, in particular three, of substantially parallel transverse slats located on the opposite side that faces the skids. Such a configuration resembles the configuration of wooden pallets which are widely used.

Preferably, the dimensions of the plastic pallet match the dimensions of standard wooden pallets. Because the pallet according to the invention is built from separate parts, it can be given the looks of a standard wooden pallet as is widely used in the so called Fast Moving Consumer Goods (FMCG) industry (ISO 8611 or Euro pallet by the company CHEP). The pallet design according to the invention is thus suitable for use in the FMCG applications and can cooperate with existing equipment in the FMCG applications. This unlike the plastic pallets known from the prior art, which have a geometry that deviates from the existing standards (ISO 8611 or CHEP) used in the FMCG applications and is thus often not accepted.

The pallet may have the same dimensions as a Euro pallet, i.e. 1200 mm×800 mm and a height of 144 mm.

Preferably, the upper deck is made in one piece with a compact skin region and a foamed core region. Also the plastic skids preferably have a compact skin region and a foamed core region. By providing pallet parts with a compact outer layer and a foamed core, a reduction of the overall density and thus weight can be achieved, while at the same time the strength of the pallet is not reduced, due to the compact outer layer. In particular a high bending resistance versus a low weight is achieved in this manner.

In a possible embodiment the spacer blocks of the pallet are monolithically formed with the skids. Thereby less separate parts are necessary to assemble the pallet.

In another possible embodiment separate spacer blocks are provided, which are formed separately from the other parts of the pallet. Providing a plastic pallet with separately formed spacer blocks has the advantage that, if a spacer block gets damaged during use, only that block needs to be replaced to repair the pallet. Furthermore, it is possible to make the separate spacer blocks from a different material than the upper deck and the skids/lower deck. Preferably, the spacer blocks are made of a stronger material. The spacer blocks are preferably formed with a compact skin region and a foamed core region. However, it is also conceivable that the spacer blocks are made as an entirely compact part (thus without foaming). A possible material that is suitable for moulding the spacer blocks is HDPE.

In a possible embodiment a recessed area is provided on the side of the upper deck that faces the skids, at a zone surrounding each of the holes for the tightening pins, which recessed area has an outer contour that corresponds with at least part of the outer contour of the associated spacer block, such that an upper end of the spacer block is received in said recessed area, thereby fixing the block with respect to the upper deck in transverse and rotational direction. By these recesses a solid pallet structure is obtained.

Possibly also on the side of the skids that faces the upper deck, at a zone surrounding each of the holes for the tightening pins, a recessed area may be provided which has an outer contour that corresponds with at least part of the outer contour of the associated spacer block, such that a lower end of the spacer block is received in said recessed area thereby fixing the block with respect to the skid in transverse and rotational direction.

By providing the upper deck and skids of the pallet with the recesses for the blocks as described above, a box frame of parts is created in which loads and impacts on the pallet are distributed throughout the pallet to other pallet parts. The bending strength of the complete pallet is thereby improved. It must be noted here that it is just as well possible to provide the upper deck and the skids with elevations and provide the spacer blocks with recesses to receive said elevations.

Preferably the tightening pin is made of plastic, preferably nylon. This provides a sufficient tension to tighten the upper deck, the spacer blocks and the skids/lower deck tightly together.

In a particularly preferred embodiment an anti-slip layer is provided on the upper side of the upper deck, which anti-slip layer is formed by one or more labels integrated in the upper surface of the upper deck. This anti-slip layer prevents goods to slide on the pallet surface during handling and transport. Preferably, the anti-slip labels are provided by in-mould labelling during the injection moulding process of the upper deck. In this way the upper deck is provided with anti-slip measures in a most efficient and cost effective way. By using the anti-slip in-mould labels the pallet can be given the same anti-skid properties as a standard wooden pallet. Contrary to the manufacturing of plastic pallets with anti-skid means known from the prior art, no additional handling process is necessary to provide anti-slip means on the pallet.

Preferably, the pallet is made at least partly of recycled plastic material. In a particular preferred embodiment the upper deck and the skids/lower deck are made of recycled plastic material, and the spacer blocks are made of new plastics material, e.g. HDPE. In this way it is possible to manufacture a plastic pallet at relatively low costs with a high impact resistance at the spacer blocks, which are the parts that suffer the most during use. The lifetime of a plastic pallet can thus be increased considerably.

In a preferred embodiment the tightening pin is provided with a detection circuit or another electronic detection means, by which the pallet can be identified. By using the detection circuit or other detection means it is for example possible to identify who is the owner of the pallet. Providing the detection circuit on the tightening pin prevents the detection circuit to get easily damaged or removed, as it is received in a bore in a spacer block of the pallet. This reduces the loss of pallets.

The invention also relates to a plastic pallet comprising a plastic upper deck with an upper side on which goods can be stacked, which upper deck is manufactured by injection moulding, preferably injection moulding with foaming, wherein an anti-slip label is arranged on the upper side of the upper deck by means of in-mould labelling. This anti-slip layer prevents goods to slide on the pallet surface during transport. Preferably, the anti-slip labels are provided by in-mould labelling during injection moulding of the upper deck. In this way the upper deck is provided with anti-slip measures in an efficient and cost effective way. By using the anti-slip in-mould labels the pallet can be given the same anti-skid properties as a standard wooden pallet. Contrary to the manufacturing of plastic pallets with anti-skid means known from the prior art, no additional handling process is necessary to provide anti-slip means on the pallet.

The invention also relates to a plastic pallet comprising a plastic upper deck with an upper side on which goods can be stacked, which upper deck is manufactured by injection moulding, preferably injection moulding with foaming, wherein a label is arranged on the upper side of the upper deck by means of in-mould labelling. In this way the plastic pallet can be provided with durable informative/indicative signs or markings of the owner or manufacturer of the pallet. Also branding or commercial communications can be applied to the pallet by the IML technique.

The invention also relates to a method for manufacturing a plastic pallet, wherein the pallet comprises a plastic upper deck with an upper side on which goods can be stacked, a plurality of plastic skids spaced apart from the upper deck and arranged substantially parallel to the upper deck, and plastic spacer blocks that are located between the upper deck and the skids, wherein the upper deck and the skids are formed by injection moulding using a mould having retractable inserts, in which the mould is filled with a plastic resin containing a foaming agent in such a way that the resin does not foam during filling of the mould and retracting the movable inserts in a mould wall whereby core areas of the moulding are allowed to foam.

The invention will be elucidated by the following detailed description with reference to the drawings, in which.

Figure 1:
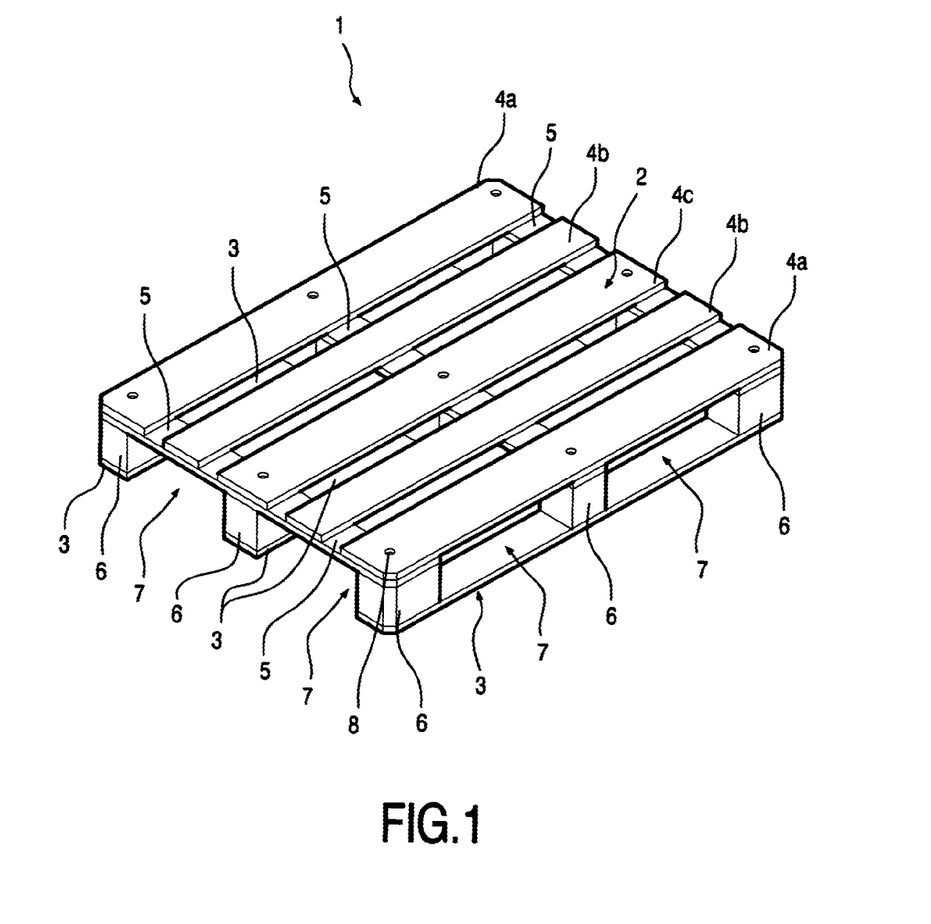
FIG. 1 shows a view in perspective of a preferred embodiment of a pallet according to the invention.

In FIG. 1 is shown a pallet 1 made of plastic material. The pallet 1 shown has an upper deck 2 on which goods can be stacked. The upper deck 2 comprises a plurality, in this particular embodiment five, of substantially parallel longitudinal slats 4a, 4b, 4c on the upper side. Furthermore the upper deck 2 comprises a plurality, in this particular embodiment three, of substantially parallel transverse slats 5 located on the opposite side of the upper deck 2. The transverse slats 5 of the upper deck 2 are evenly distributed over the length of the pallet 1.

In the specific embodiment shown, the longitudinal slats 4a on the outer sides and the longitudinal slat 4c in the middle have substantially the same width. The intermediate longitudinal slats 4b have a smaller width than the slats 4a,4c. By this configuration of upper slats, the upper deck resembles the looks and dimensions of a so called "Euro" pallet which is widely used in Europe in wooden form. Preferably the upper deck has the dimensions of a Euro pallet, which is 1200×800 mm. However these dimensions and configuration must not be considered as limiting for the invention.

The upper deck 2 of the pallet 1 is made in one piece by injection moulding as will be described further below. As a result the longitudinal slats 4a-4c and the transverse slats 5 are formed monolithically.

The pallet 1 furthermore has skids 3 which extend in the longitudinal direction of the pallet 1, i.e. in the same direction as the longitudinal slats 4a-4c of the upper deck 2. In the particular embodiment shown in FIG. 1, there are provided three skids 3 evenly distributed over the width of the pallet 1.

The skids 3 are spaced apart from the upper deck 2 by means of spacer blocks 6. There are provided three spacer blocks 6 per skid 3. The mutual distance between the spacer blocks 6 associated with one skid 3, corresponds to the mutual distance between the transverse slats 5 of the upper deck 2, such that in a mounted state the transverse slats 5 of the upper deck 2 engage the spacer blocks 6. The intermediate space between the blocks 6 provide windows 7 which allow the insertion of tines (not shown) of a forklift or another lifting equipment for lifting and/or transporting the pallet 1.

In the specific embodiment shown in FIG. 1 the spacer blocks 6 are monolithically formed with the skids 3.

Figure 6:
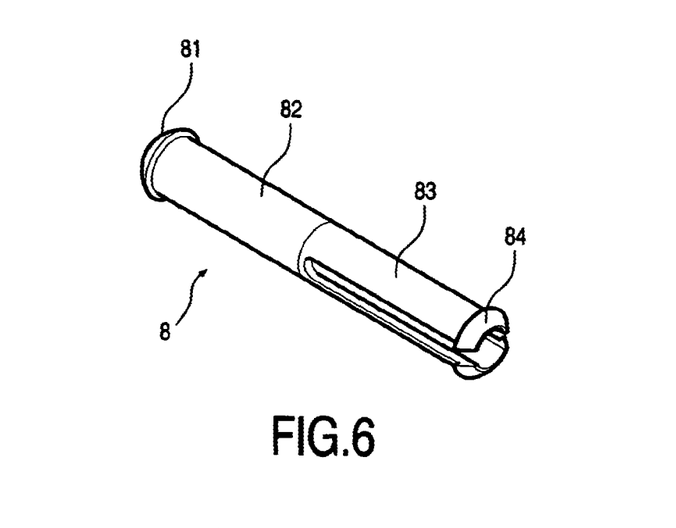
Figure 9:
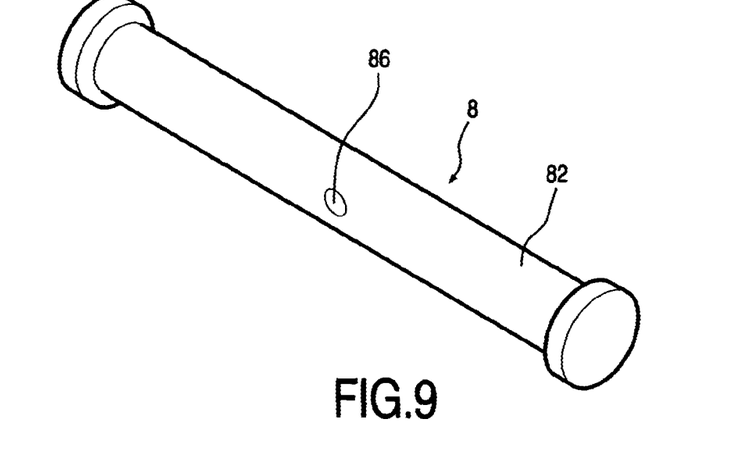
FIG. 9 shows a tightening pin with a recess in the shaft.
Figure 10:
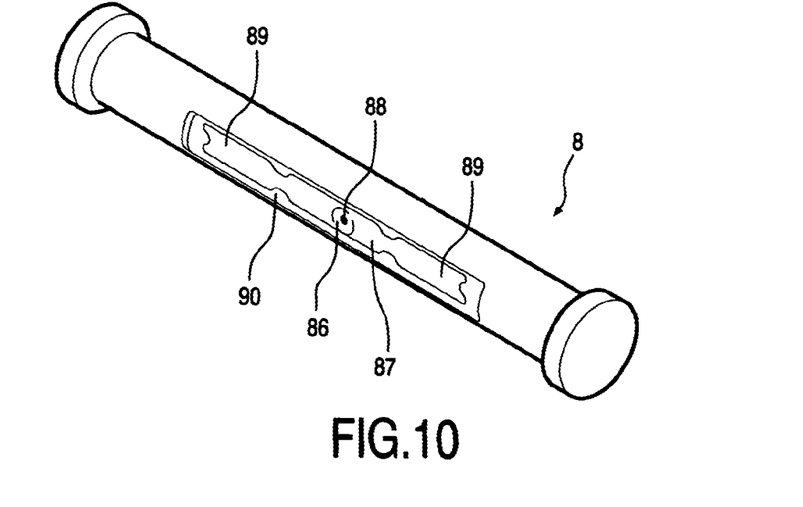
FIG. 10 shows the tightening pin of FIG. 9, with an identification tag applied to the shaft.

The skids 3 with their integral spacer blocks 6 are fixed to the upper deck by means of tightening pins 8. An example of such a tightening pin 8 is shown in FIG. 6, FIGS. 9 and 10.

The tightening pin 8 is made of a plastic material, for example nylon, but may also be made of another suitable material. The tightening pin 8 comprises a first head 81, a more or less rigid shaft portion 82, a flexible deformable shaft portion 83 and a deformable second head 84.

The tightening pin has an axial bore 85 extending through the first head 84 and the shaft 83. A substantially cylindrical inner locking pin (not shown) can be inserted in the bore 85, whereby the head and shaft cannot deform radially inward anymore. The outer pin 8 and the inner pin can be made of different materials. In a possible embodiment the outer pin, which has to resist the tension loads can be made of nylon, while the inner pin can be made relatively cheap of PP or recycled plastic material.

The upper deck 2 of the pallet 1 is provided with through bores which extend through the longitudinal slats 4a, 4c and the transverse slats 5 for passing through the tightening pin 8. In the upper surface of the longitudinal slats 4a, 4c a recessed area is provided around each of the bores such that the head 81 of the tightening pin 8 lies countersunk with respect to the upper surface of the longitudinal slats 4a, 4c.

The skids 3 and their integral spacer blocks 6 are provided with through bores for passing through the tightening pin 8. Also in the lower side of the skids 3, such a recessed area is provided such that the head 82, of the tightening pin 8 is countersunk with respect to the lower surface of the skid 3.

During assembly of the pallet 1, the blocks 6 are positioned against the upper deck 2 such that their respective through bores are aligned. Then the tightening pins 8 can be forced through the bores, during which the deformable head 84 and the deformable shaft 83 portion are deformed such that the tightening pin 8 can move through the bores. When the deformable head 84 has passed through the bores it will expand again and snap-lock behind the edge of the recessed area in the skid 3 concerned. In this manner the upper deck 2 and the skids 3 with their integral blocks 6 are tightened together. Next the cylindrical inner locking pin can be tightly fitted in the axial bore 85, whereby the bore is filled and the head 84 cannot deform radially inward whereby the outer pin 8 could be retracted from the bores in the blocks 6 and upper deck 2. The tight fit between the inner locking pin and the outer tightening pin 8 is such that the risk that filth and bacteria enter in the axial bore 85 is reduced to a minimum.

The upper deck 2 and the skids with their integral spacer blocks 6 are manufactured by injection moulding. In particular they are made by injection moulding a plastic containing a foaming agent.

The moulding of these parts will now be explained with reference to FIGS. 8a-8i.

Figure 8A:
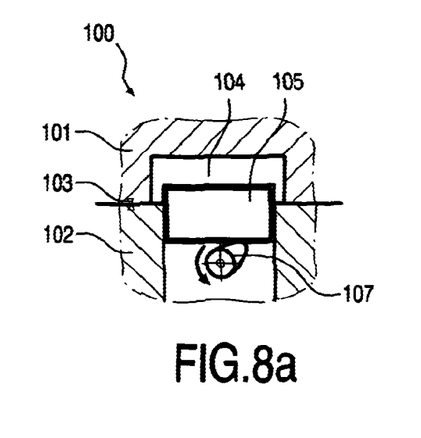
FIG. 8a-8i show schematically the different stages in an injection mould for manufacturing a part of a pallet according to the invention.

In FIG. 8a is shown a schematic mould 100, which has generally two mould halves 101, 102 separated by a division line indicated by reference numeral 103. The mould halves 101, 102 define a mould cavity 104. In the particular injection mould shown, a movable insert 105 is provided in mould half 102. However, it is also possible that in both of the mould halves movable inserts are arranged. The mould 100 has an injection inlet indicated by arrow 106 in FIG. 8b, where the molten plastic is injected. In FIG. 8a the movable insert 105 is in an inward position.

The insert 105 is operated by a cam 107 which is mounted on a rotatable cam shaft. The angular position of the cam 107 defines the position of the insert 105 with respect to the mould halves 101, 102.

Figure 8B:
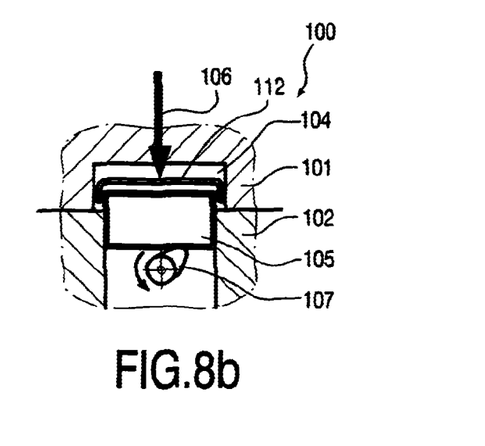
Figure 8C:
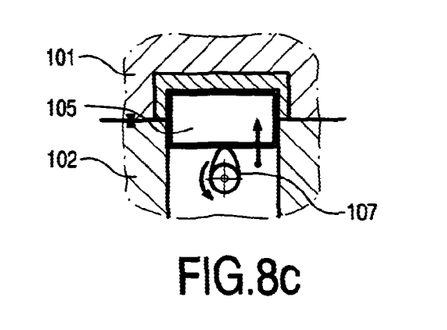

In FIG. 8b is shown schematically how the molten plastic 112 is injected into the mould 100 and spreads into the mould cavity 104. The plastic used is a suitable plastic containing a foaming agent. Preferably a recycled plastic is used to keep the manufacturing costs low. This recycled plastic may contain PE, PP and/or other suitable plastics.

Figure 8D:
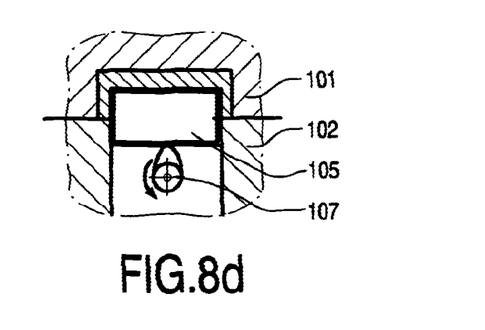

When the mould cavity 104 is filled, the injection inlet is closed. Then a cooling period takes place. This period may take 4-10 seconds. At the beginning of the cooling period the movable insert 105 is forced to a position further inward (FIG. 8c), whereby the injected plastic is compressed. The insert 105 is held in that position for 4-10 seconds, during which a skin layer is formed (FIG. 8d).

Figure 8E:
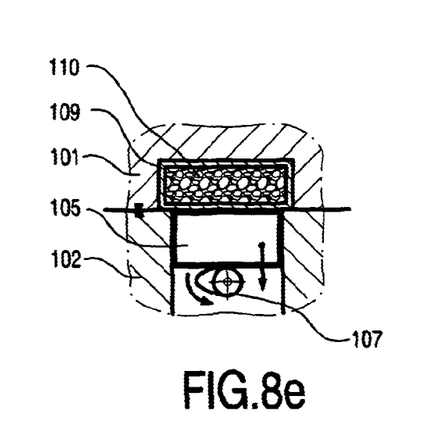

After the cooling period the cam 107 rotates further, whereby the movable insert 105 is allowed to move outward (FIG. 8e).

By moving the insert 105 to an outward position, the volume of the moulding cavity 104 increases. This causes a pressure drop, whereby the foaming agent starts working and foaming of the molten plastic starts. When the molten plastic is injected into the mould, the metal of the mould is relatively cool. Thereby the plastic that is in contact with the mould and in a region nearby will not foam, but will form a relatively dense structure. Hence a compact skin layer 109 is formed. Inward from the compact skin layer 109 a foamed core region 110 is formed. When the mould cavity is enlarged by retracting the movable insert 105, the skin layer 109 will not change but the further the position from the skin layer the plastic will gradually foam more and more towards the core. Most of the foaming will take place at the core of the moulded product. By this foaming the density of the overall product is about half of the density if the product would have been manufactured with compact injection moulding (thus without foaming). During retraction of the insert 105 some additional molten plastic may be injected through the injection inlet. Typically this may be about 5% of the total amount of injected plastic material.

Figure 8F:
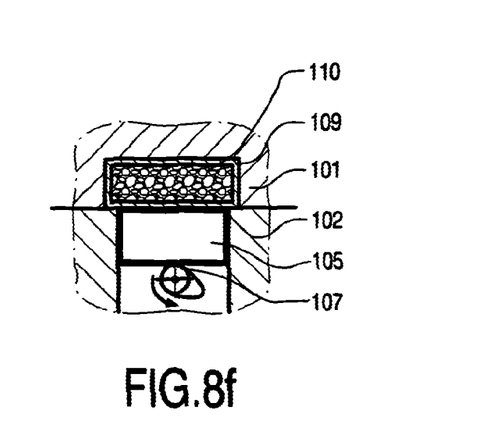

The cam 107 is formed such that the insert 105 is held for about 10-75 in a stationary position while the product is cooled (cf. FIGS. 8e and 8f).

Figure 8G:
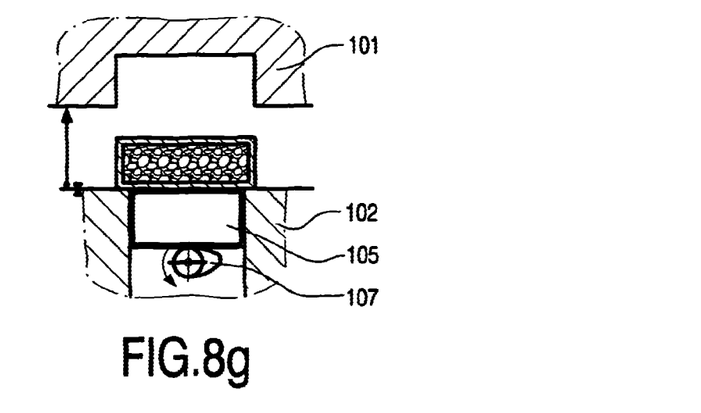

Next, the mould 100 is opened (see FIG. 8g).

Figure 8H:
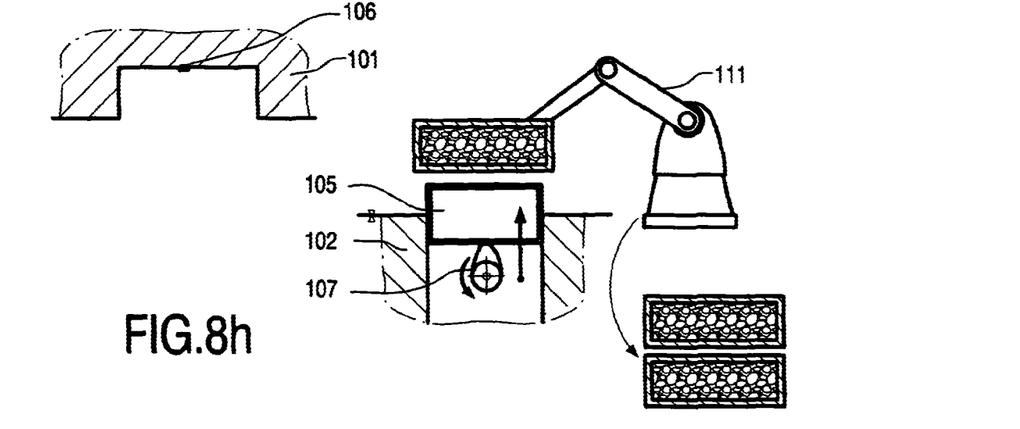

Then the lower mould halve 102 is slided transversely towards a picking robot 111, as is illustrated in FIG. 8h. Next, the product is ejected from the lower mould halve by the insert which is again operated by the cam 107 as is illustrated in FIG. 8h. The robot 111 can now pick up the still warm but solid product and stack it on other products. On this stack the products are allowed to further cool down to ambient temperature.

Figure 8I:
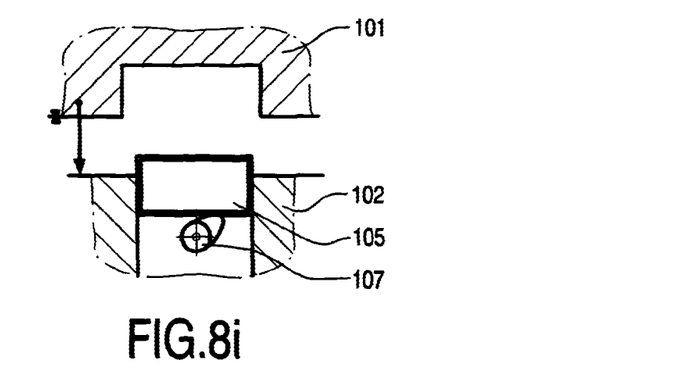

When the product is picked up by the robot 111, the lower mould half 102 is moved back in line with the other mould half 101 as is illustrated in FIG. 8i. The mould 100 can now be closed again and the movable insert 105 is moved back in the initial position as is shown in FIG. 8a.

The whole cycle that is illustrated in FIGS. 8a-8i may take about 90 seconds for the parts of the pallet.

Figure 2:
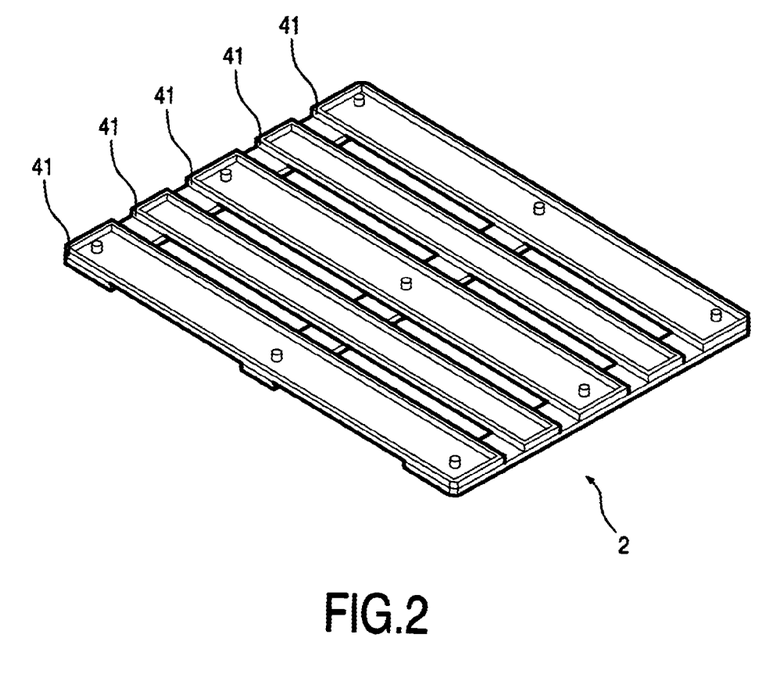
FIG. 2 shows a view in perspective of an upper deck of the pallet of FIG. 1 in an intermediate state during manufacturing.

The upper deck 2 is injection moulded with inserts that engage the upper side of the longitudinal slats 4a-4c. In FIG. 2 is shown an intermediate state of the upper deck 2 during injection moulding, in which the movable inserts have not yet been retracted. There are thus peripheral upstanding side edges 41 present as is visible in FIG. 2. Next, the inserts are moved to an outward position, after which the plastic in the longitudinal slats 4a-4c, but also in the transverse slats 5 starts to foam. Thereby the compact skin layer moves upward and is pressed to the retracted movable inserts so as to form a compact outer layer, whereas the more inwardly located material is foamed and contains small cells (cf. FIGS. 8e-8f), which reduces the density, and thus the weight of the upper deck 2 to a great extent.

In FIG. 2 is indicated by a dashed region that the intermediate space between two longitudinal slats 4a-4c on top of the transverse slats 5 may be filled with plastic material too. Effectively the upper deck 2 would then have a flat upper surface with slots in them.

The skids 3 may be manufactured in the same way as the upper deck 2 by injection moulding and foaming. The skids may be moulded with integral spacer blocks 6 as is shown in FIG. 1. However, it is also possible that the skids 3 and the blocks 6 are separate parts which are injection moulded in different moulds.

Figure 3:
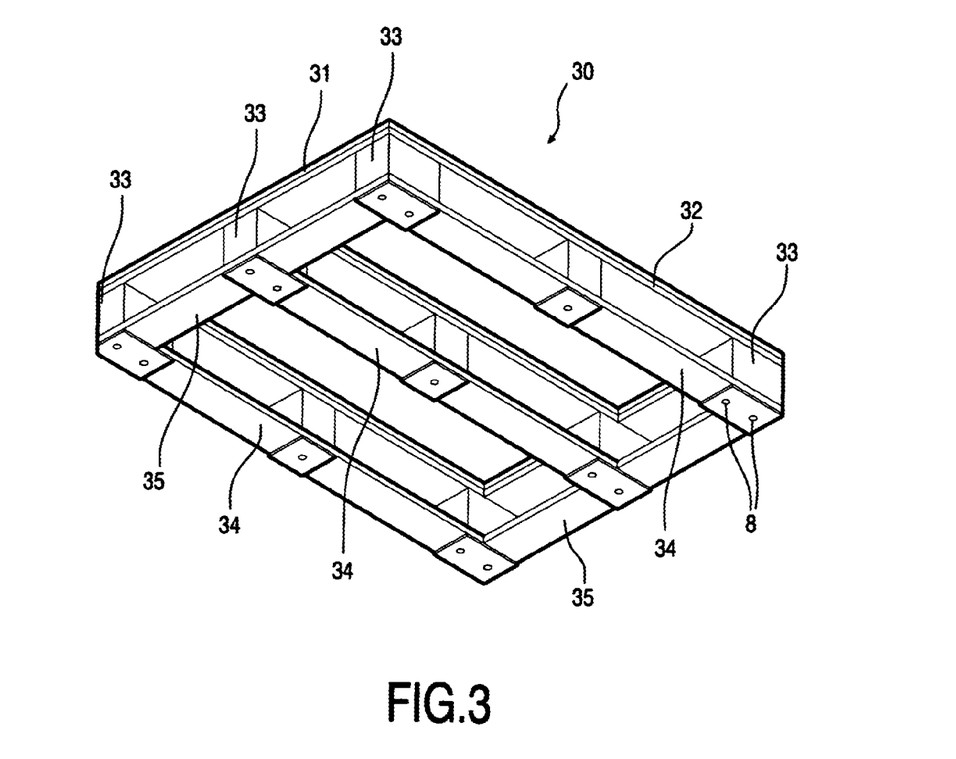
FIG. 3 shows a view in perspective of another embodiment of a pallet according to the invention.

In FIG. 3 another embodiment of a pallet 30 is shown. This pallet 30 has more separate parts than the pallet in FIG. 1. It has a plate like upper deck 31 with slots formed in it. It has three longitudinal slats 32 arranged on the underside of the upper deck 31. These longitudinal slats 32 are manufactured as separate parts. Furthermore it has nine spacer blocks 33. At the underside of the pallet 30 are provided three longitudinal skids 34 and at the ends thereof are provided transverse slats 35. The longitudinal skids 34 are shown in more detail in FIGS. 4a-4c. The transverse slats 35 are shown in more detail in FIGS. 5a-5c.

Figure 4A:
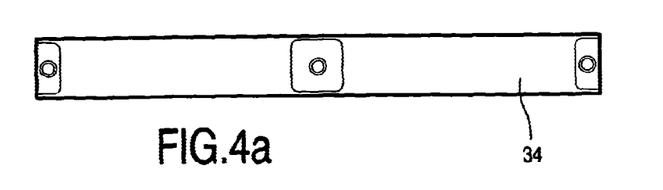
FIG. 4a shows a view from above of a skid for the pallet of FIG. 3.
Figure 4B:
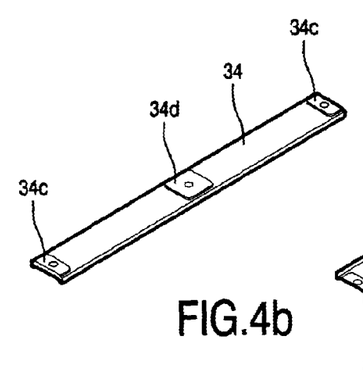
FIG. 4b shows a view in perspective from above of the skid of FIG. 4a, FIG. 4c shows a view in perspective from below of the skid of FIG. 4a, FIG. 5a shows a view from above of a transverse slat for the lower side of the pallet of FIG. 3.
Figure 4C:
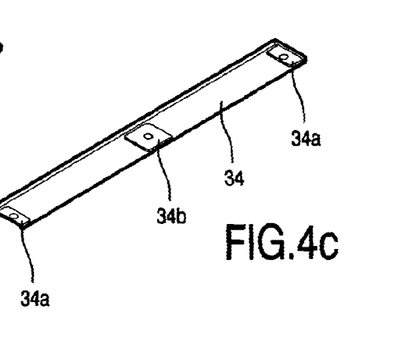
Figure 5A:
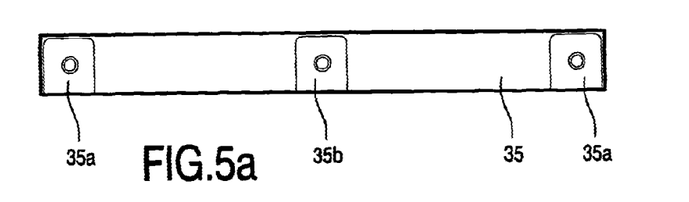
Figure 5B:
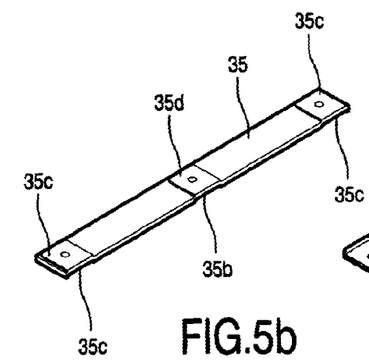
FIG. 5b shows a view in perspective from above of the slat of FIG. 5a, FIG. 5c shows a view in perspective from below of the slat of FIG. 5a, FIG. 6 shows a view in perspective of a tightening pin for a pallet according to the invention.
Figure 5C:
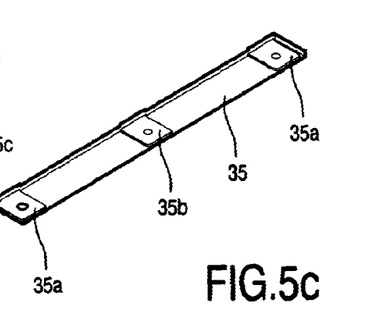

As can be seen in FIG. 4a-4c, the skids 34 are provided on their upper side, which is the side that faces the upper deck 31, with outer recesses 34a and central recess 34b. The recesses 34a-34b are provided to receive and end portion of the spacer blocks 6 and have a contour that corresponds to the peripheral contour of the spacer blocks 6. Thereby the spacer blocks 6 are locked against transversal and rotational movement. As can be seen in FIG. 5a-5c, the transversal slats 35 are provided with similar recesses 35a, 35b.

In a preferred embodiment the skids and slats 34, 35 have on the opposite side of the respective recesses 34a, 34b, 35a, 35b a complementary elevation 34c, 34d, 35c, 35d respectively. These elevations provide the possibility to stack the skids 34 and the slats 35 after they have been manufactured and stored before the pallets 30 are assembled.

Figure 7:
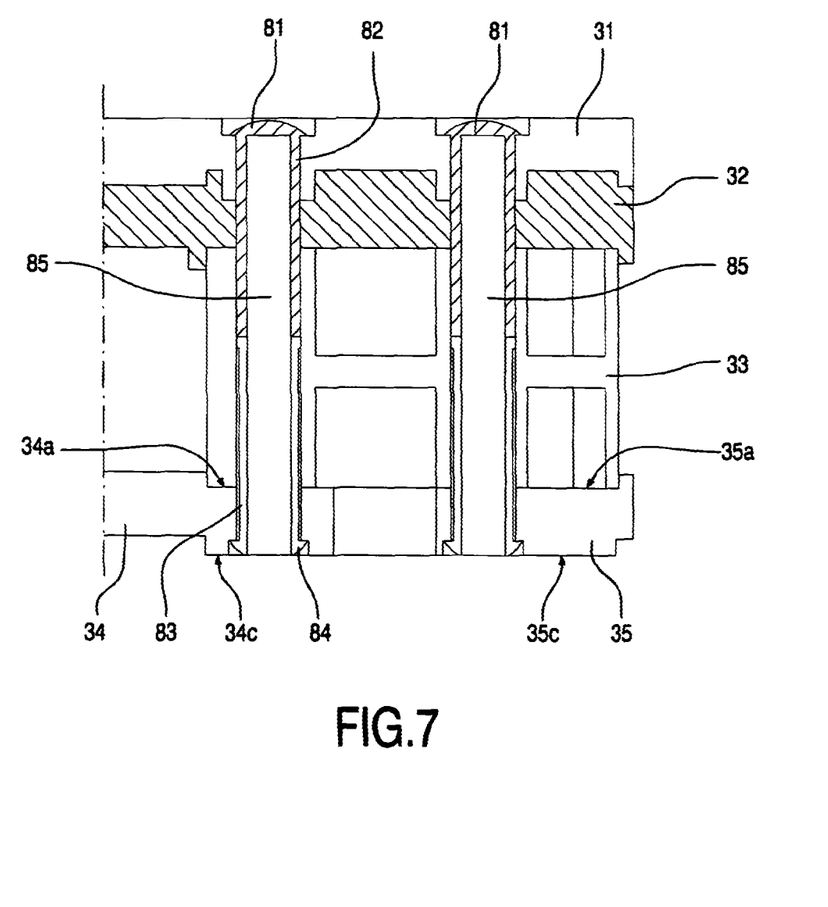
FIG. 7 shows a cross section of a part of the pallet of FIG. 3, in which the tightening connection with pins according to FIG. 6 are illustrated.

In FIG. 7 is shown how the different parts of the pallet 30 are tightened together by two adjacent tightening pins 8.

Figure 11:
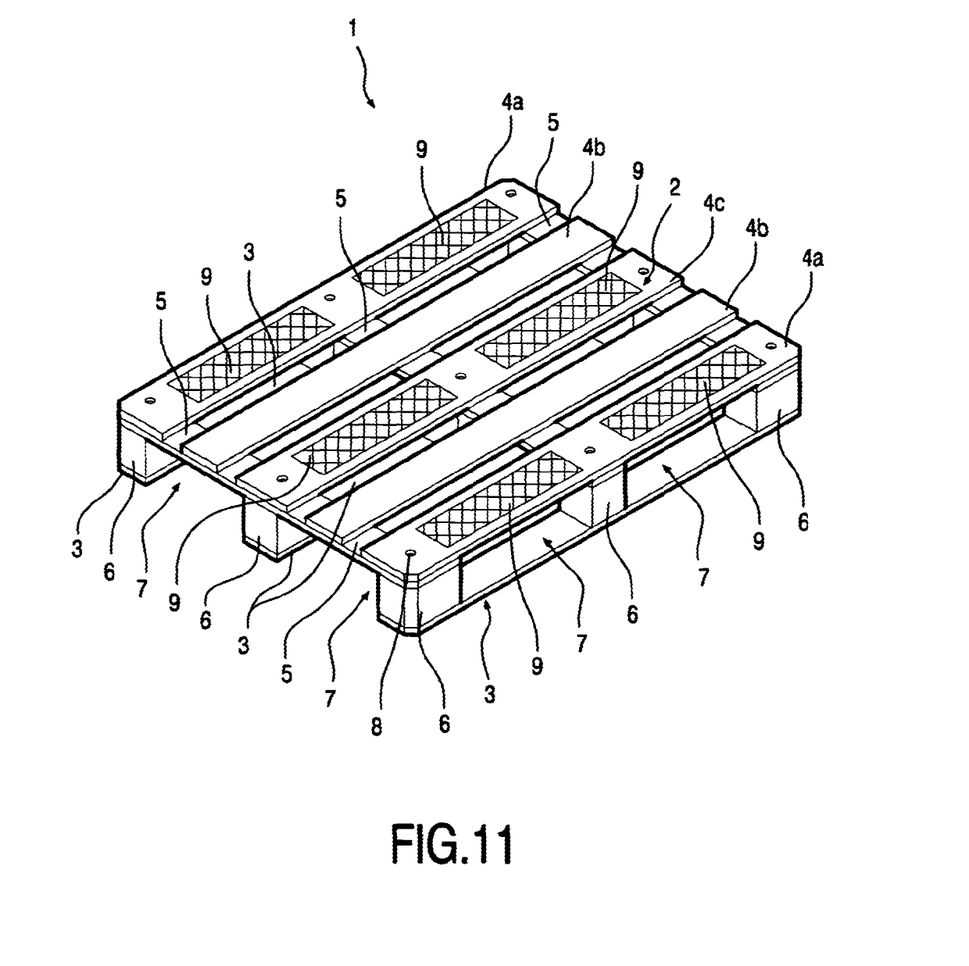
FIG. 11 shows the pallet of FIG. 1 with anti-slip regions on the upper deck.

The upper deck 2 and 31 of pallets 1 and 30 may comprise an anti-slip layer. Preferably this anti slip layer is constituted by a label that has an outer side that has anti-slip properties. Advantageously the label is suitable for in-mould labelling (IML) in which it is arranged in the mould after which plastic material is injected in the mould. In a possible embodiment the anti-slip labels may be arranged against the movable inserts in the mould for forming the upper side of the upper deck 2, 32. The anti-slip labels provide additional friction to the upper side of the upper deck 2, 32 and thus prevent goods placed on the upper side of the upper deck 2, 32 to slide during transport. In FIG. 11 is shown a pallet 1 wherein anti slip labels 9 are provided on a part of the longitudinal slats 4 of the upper deck 2, in particular on the slats 4a.

It is also conceivable to provide the underside of the skids with anti-slip labels.

Furthermore it is also conceivable to provide the underside of the upperdeck with anti-slip labels. This will reduce the risk that the pallet slides of the forklift tines during logistic operations.

The tightening pin 8 can have on the outer surface of the shaft 82 a recess 86 (see FIG. 9). A Radio Frequency Identification (RFID) tag 87 is applied to the shaft 82 (see FIG. 10). The tag 87 may include a chip 88 which is received in the recess 86. Furthermore the tag comprises antennas 89 integrated in an adhesive tape 90 which is adhered to the shaft 82. As the shaft 82 in the assembled state of the pallet is located inside the bore of the strong spacer block, the tag is well protected against damage during normal use of the pallet. Furthermore the tag cannot be easily removed from the pallet.

With the RFID transponder in the spacer block, pallet movements can be followed with an RFID integrated system. Thereby the loss of pallets out in the Fast Moving Consumer Goods industries can be reduced considerably. The pallet obtains its unique identification tag during the pallet assembly by a unique tightening pin.

In a preferred embodiment at least one spacer block at the corner of the pallet is provided with an identification tag. Thereby the best RFID reading performance is obtained, especially on steel loading docks and dock door reading tunnels.

In a further preferred embodiment one main identification tag is arranged in one spacer block, and another, backup identification tag is arranged in another spacer block so as to be able to identify the pallet when the detection of the main tag fails, e.g. when it is damaged somehow. Preferably the main tag and the backup tag are arranged in different spacer blocks at the corners of the pallet.

It must be noted here that the identification tag described above is an example which should not be interpreted limitative. It is also conceivable to apply other know identification tags to the pallet.

The invention claimed is:

1. A plastic pallet comprising:
   a plastic upper deck having a compact skin region and a foamed core region, and having an upper side on which goods can be stacked,
   a plurality of plastic skids having a compact skin region and a foamed core region, said plastic skids being spaced apart from the upper deck and arranged substantially parallel to the upper deck, and
   plastic spacer blocks that are located between the upper deck and the skids, wherein the spacer blocks are formed by moulding as separate parts in which the plastic spacer blocks have a compact skin region and a foamed core region or are made as an entirely compact part, wherein the upper deck and the skids are separate parts that are tightened together by plastic tightening pins, which each extend through a bore in each of the spacer blocks and corresponding holes in the upper deck and the skids, and wherein the plastic tightening pins form weak points for breakage.

2. The plastic pallet according to claim 1, wherein the pallet comprises three substantially parallel plastic skids.

3. The plastic pallet according to claim 1, wherein the upper deck comprises a plurality of substantially parallel longitudinal slats on the upper side and a plurality of substantially parallel transverse slats located on the opposite side that faces the skids.

4. The plastic pallet according to claim 1, wherein the upper deck is made in one piece with a compact skin region and a foamed core region.

5. The plastic pallet according to claim 1, wherein on a side of the upper deck that faces the skids, at a zone surrounding each of the holes for the tightening pins, a recessed area is provided which has an outer contour that corresponds with at least part of the outer contour of the associated spacer block, such that an upper end of the spacer block is received in said recessed area thereby fixing the block with respect to the upper deck in transverse and rotational direction.

6. The plastic pallet according to claim 1, wherein on a side of the skids that faces the upper deck, at a zone surrounding each of the holes for the tightening pins, a recessed area is provided which has an outer contour that corresponds with at least part of the outer contour of the associated spacer block, such that a lower end of the spacer block is received in said recessed area thereby fixing the block with respect to the skid in transverse and rotational direction.

7. The plastic pallet according to claim 1, wherein the tightening pins are made of nylon.

8. The plastic pallet according to claim 3, wherein outer longitudinal slats and a central longitudinal slat of the upper deck have a greater width than intermediate slats.

9. The plastic pallet according to claim 1, wherein the pallet has dimensions of 1200 mm×800 mm.

10. The plastic pallet according to claim 1, wherein the pallet has a height of about 144 mm.

11. The plastic pallet according to claim 1, wherein an upper side of the upper deck is provided with an anti-slip layer of one or more labels integrated in the upper side of the upper deck.

12. The plastic pallet according to claim 11, wherein the labels are provided by in-mould labelling during injection moulding of the upper deck.

13. The plastic pallet according to claim 1, wherein at least parts of the pallet are made of recycled plastic material.

14. The plastic pallet according to claim 1, wherein the tightening pins are provided with a detection circuit or another electronic detection means, by which the pallet can be identified.

15. The plastic pallet according to claim 1, wherein the upper deck is manufactured by injection moulding, and further comprising a label arranged on the upper side of the upper deck by means of in-mould labelling.

16. The plastic pallet according to claim 1, wherein the upper deck is manufactured by injection moulding, and wherein an anti-slip label is arranged on the upper side of the upper deck by means of in-mould labelling.

17. The plastic pallet of claim 1, wherein the plastic tightening pins further comprise a rigid shaft portion and a flexible deformable shaft portion.

18. A method for manufacturing a plastic pallet, wherein the pallet
   comprises a plastic upper deck with an upper side on which goods can be stacked, a plurality of plastic skids spaced apart from the upper deck and arranged substantially parallel to the upper deck, and plastic spacer blocks that are located between the upper deck and the skids, the method comprising:
   forming the upper deck and the skids by injection moulding using a mould having retractable inserts, in which the mould is filled with a plastic resin containing a foaming agent in such a way that the resin does not foam during filling of the mould;
   retracting the retractable inserts in a mould wall whereby core areas of the moulding are allowed to foam, wherein the upper deck and skids are provided with holes;
   forming the spacer blocks having a bore by injection moulding;
   assembling the plastic pallet by placing the spacer blocks between the skids and the upper deck; and
   inserting a plastic tightening pin through the bore in each of the spacer blocks and through corresponding holes in the upper deck and skids, thereby tightening the upper deck, the spacer blocks and the skids together and wherein the plastic tightening pin forms a weak point for breakage.

19. The method according to claim 18, further comprising operating the inserts by a cam mounted on a cam shaft.

20. A plastic pallet comprising a plastic upper deck with an upper side on which goods can be stacked, the upper deck being formed in one piece having a plurality of substantially parallel longitudinal slats on the upper side and a plurality of substantially parallel transverse slats located on the opposite side, a plurality of plastic skids spaced apart from the upper deck and arranged substantially parallel to the upper deck, and plastic spacer blocks that are located between the upper deck and the skids, wherein the upper deck and the skids are separate parts that are tightened together by plastic tightening pins, which each extend through a bore in each of the spacer blocks and corresponding holes in the upper deck and the skids and wherein the plastic tightening pins form weak points for breakage-, wherein the upper deck has a compact skin region and a foamed core region, the plastic skids have a compact skin region and a foamed core region, and the spacer blocks are formed as separate parts and have a compact skin region and a foamed core region or are made as an entirely compact part.

* * * * *